United States Patent
Kim et al.

(10) Patent No.: US 10,560,167 B2
(45) Date of Patent: Feb. 11, 2020

(54) METHOD FOR TRANSMITTING AND RECEIVING SIGNAL USING BEAM SHARING BETWEEN USER EQUIPMENTS

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kyungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/748,408

(22) PCT Filed: Jun. 27, 2016

(86) PCT No.: PCT/KR2016/006851
§ 371 (c)(1),
(2) Date: Jan. 29, 2018

(87) PCT Pub. No.: WO2017/018671
PCT Pub. Date: Feb. 2, 2017

(65) Prior Publication Data
US 2018/0219600 A1    Aug. 2, 2018

Related U.S. Application Data

(60) Provisional application No. 62/199,206, filed on Jul. 30, 2015.

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01); *H04B 7/0617* (2013.01); *H04B 7/0632* (2013.01); *H04B 7/0639* (2013.01)

(58) Field of Classification Search
CPC .. H04B 7/0626; H04B 7/0417; H04B 7/0617; H04B 7/0632; H04B 7/0639; H04B 7/0695; H04B 7/0408; H04B 7/0452
See application file for complete search history.

(56) References Cited

U.S. PATENT DOCUMENTS

2013/0343303 A1    12/2013   Kim et al.
2014/0011468 A1    1/2014    Park et al.
(Continued)

FOREIGN PATENT DOCUMENTS

KR    1020150064383 A    6/2015

OTHER PUBLICATIONS

Huawei, "Using AAS for coverage modification," 3GPP TSG-RAN WG3 Meeting #81, Aug. 19-23, 2013, R3-131287.
(Continued)

*Primary Examiner* — Ian N Moore
*Assistant Examiner* — Brian T Le
(74) *Attorney, Agent, or Firm* — Dentons US LLP

(57) ABSTRACT

The present invention relates to a method for receiving a signal in a wireless communication system, and an apparatus therefore. Particularly, the present invention relates to a method and an apparatus therefore, the method comprising the steps: receiving information associated with a preferred beam from another user equipment (UE), wherein the information associated with the preferred beam includes information indicating at least one preferred beam for said another UE; determining at least one shared beam on the basis of the received information associated with the preferred beam; transmitting, to a base station, information associated with the at least one determined shared beam; determining a beam dedicated for a particular UE on the basis of the at least one determined shared beam; transmitting, to the base station, information associated with the
(Continued)

determined dedicated beam; and simultaneously receiving, from the base station, UE-common data on the basis of the information associated with the at least one shared beam, and UE-specific data on the basis of the information associated with the dedicated beam.

20 Claims, 6 Drawing Sheets

(56) References Cited

U.S. PATENT DOCUMENTS

2014/0294107 A1* 10/2014 Shin ................. H04B 7/0456
  375/267
2014/0321563 A1* 10/2014 Park ................ H04L 25/03898
  375/260

OTHER PUBLICATIONS

Huawei, "Some corrections on AAS TR34.840 ver 020," 3GPP TSG-RAN WG4 Meeting #63, May 21-25, 2012, R4-122526.
Ericsson, "On definition of beam-forming related to AAS BS," 3GPP TSG-RAN WG4 meeting #67, May 20-24, 2013, R4-132203.

* cited by examiner

: activated DU

: deactivated DU

METHOD FOR TRANSMITTING AND RECEIVING SIGNAL USING BEAM SHARING BETWEEN USER EQUIPMENTS

This application is a 35 USC § 371 National Stage entry of International Application No. PCT/KR2016/006851 filed on Jun. 27, 2016, and claims priority to U.S. Provisional Application No. 62/199,206 filed on Jul. 30, 2015, all of which are hereby incorporated by reference in their entireties as if fully set forth herein.

TECHNICAL FIELD

The present invention relates to a wireless communication system, and more specifically, relates to a method and apparatus for transmitting and receiving signals using a beam shared between user equipments based on cooperation between the user equipments.

BACKGROUND ART

MIMO (multiple-input multiple-output) used in a wireless communication system is a scheme of increasing channel capacity and enhancing transceiving efficiency using multiple transmitting antennas and/or multiple receiving antennas. MIMO may be called a multi-antenna.

In MIMO environment, it may be unnecessary for data to be transmitted on a single antenna path. For instance, in MIMO environment, a receiver can reconfigure data by aggregating data fragments respectively received through a plurality of receiving antennas. Comparing a single antenna environment and an MIMO environment to each other, a data rate can be improved by maintaining a cell area size or coverage can be increased by maintaining a data rate, in MIMO environment.

A beamforming scheme in MIMO environment is widely used for a base station, a user equipment, a relay or the like. The beamforming scheme can be classified into a digital beamforming scheme or an analog beamforming scheme depending on whether a weight vector/matrix (or a precoding vector/matrix) is used for a baseband or an RF band. And, the digital beamforming scheme is applied to a precoding procedure of 3G/4G mobile communication system. For instance, in a current mobile communication system, a user equipment feds back a precoding matrix index (PMI) to a base station for a closed-loop based digital beamforming and the base station performs a beamforming based on the PMI.

DISCLOSURE

Technical Problem

An object of the present invention devised to solve the problem lies in a method and device for effectively transmitting and/or receiving data in a wireless communication system.

Another object of the present invention devised to solve the problem lies in a method and device for effectively transmitting and/or receiving data by sharing a beam between user equipments (UEs) based on cooperation between UEs in a wireless communication system.

Another object of the present invention devised to solve the problem lies in a method and device for transmitting and/or receiving control information for enhancing data transmission efficiency by sharing a beam between UEs in a wireless communication system.

It is to be understood that both the foregoing general description and the following detailed description of the present invention are exemplary and explanatory and are intended to provide further explanation of the invention as claimed.

Technical Solution

In an aspect of the present invention, provided herein is a method of receiving a signal by a specific user equipment (UE) in a wireless communication system, the method comprising: receiving information about a preferred beam from another UE, the information about the preferred beam comprising information indicating at least one preferred beam for the another UE; determining at least one shared beam based on the received information about the preferred beam; transmitting information about the determined at least one shared beam to a base station (BS); determining a dedicated beam of the specific UE based on the determined at least one shared beam; transmitting information about the determined dedicated beam to the BS; and simultaneously receiving UE-common data based on the information about the at least one shared beam and UE-specific data based on the information about the dedicated beam from the BS.

In another aspect of the present invention, provided herein is a user equipment (UE) for transmitting precoding information in a wireless communication system, the UE comprising: a radio frequency (RF) unit configured to transmit and receive a radio signal; and a processor connected to the RF unit while being operated, wherein the processor is configured to receive information about a preferred beam from another UE, the information about the preferred beam comprising information indicating at least one preferred beam for the another UE, to determine at least one shared beam based on the received information about the preferred beam, to transmit information about the determined at least one shared beam to a base station (BS), to determine a dedicated beam of the specific UE based on the determined at least one shared beam, to transmit information about the determined dedicated beam to the BS, and to simultaneously receive UE-common data based on the information about the at least one shared beam and UE-specific data based on the information about the dedicated beam, from the BS.

Preferably, the method further comprises receiving group information from the BS, wherein the group information comprises information indicating a representative UE in a UE group and information indicating one or more member UEs, and wherein the specific UE corresponds the representative UE.

Preferably, the method further comprises determining at least one preferred beam of the specific UE, wherein the at least one shared beam is determined from among beams overlapping between at least one preferred beam for the specific UE and the at least one preferred beam for the another UE.

Preferably, the method further comprises receiving information indicating a specific shared beam from the BS, wherein the dedicated beam is determined from among beams other than the specific shared beam.

Preferably, the information about the preferred beam further comprises information about priority of at least one shared beam candidate.

Preferably, each of the information about the shared beam and the information about the dedicated beam comprises precoding matrix index information.

Preferably, the UE-common data is received through a physical broadcast channel (PBCH) and the UE-specific data is received through a physical downlink shared channel (PDSCH).

Preferably, the UE-common data is received through a physical multicast channel (PMCH) and the UE-specific data is received through a physical downlink shared channel (PDSCH).

Preferably, the UE-common data and the UE-specific data are received through different antenna ports.

Advantageous Effects

According to the present invention, data may be effectively transmitted and/or received in a wireless communication system.

According to the present invention, data may be effectively transmitted and/or received by sharing a beam between user equipments (UEs) based on cooperation between UEs in a wireless communication system.

According to the present invention, control information may be transmitted and/or received to enhance data transmission efficiency by sharing a beam between UEs in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical scope of the present invention. For example, the present invention may be applied to a system in accordance with a 3GPP LTE/LTE-A system as well as a system in accordance with another 3GPP standard, IEEE 802.xx standard, or 3GPP2 standard.

In the present specification, a user equipment (UE) may be fixed or mobile. The user equipment (UE) refers to one of various apparatuses communicating with a base station (BS) to transmit and receive data and/or control information. The UE may be referred to as a terminal, a Mobile Station (MS), a Mobile Terminal (MT), a User Terminal (UT), a Subscriber Station (SS), a wireless device, a Personal Digital Assistant (PDA), a wireless modem, a handheld device, etc. In the present specification, the term "UE" may be interchangeably used with the term "terminal".

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present invention, the term "BS" may be interchangeably used with the term "eNB".

MIMO Environment

Figure 1:
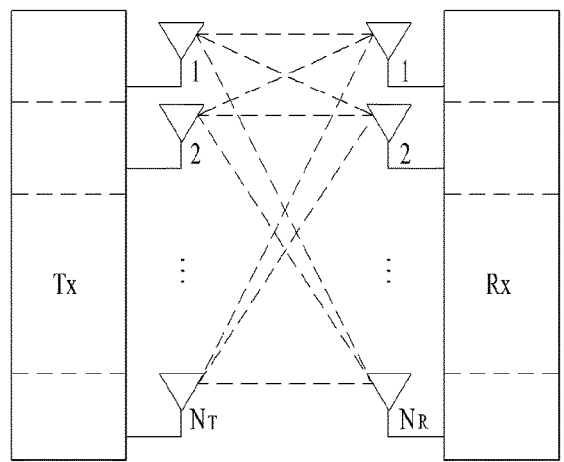
FIG. 1 is a diagram of a MIMO environment.

FIG. 1 is a diagram of a MIMO environment.

Referring to FIG. 1, $N_T$ transmitting antennas are installed on a transmitting stage, while $N_R$ receiving antennas are installed on a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_o$, the transmission rate in case of using multiple antennas may be theoretically raised by a result from multiplying the maximum transmission rate $R_o$ by a rate increasing rate $R_i$, as shown in Equation 1. In this case, $R_i$ is a smaller one of $N_T$ and $N_R$.

For instance, in an MIMO communication system, which uses 4 transmitting antennas and 4 receiving antennas, it may be able to obtain a transmission rate 4 times higher than that of a single antenna system.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, a maximum number of transmittable information is $N_T$. Hence, the transmitted information may be represented by $N_T \times 1$ vector as shown in Equation 1.

$$s = [s_1, s_2, \ldots, s_{N_T}]^T \quad \text{[Equation 1]}$$

Meanwhile, transmission powers can be set different from each other for transmitted information $s_1, s_2, \ldots, s_{N_T}$, respectively. If the transmission powers are set to $P_1, P_2, \ldots, P_{N_T}$, respectively, the transmission power adjusted transmission information can be represented by $N_T \times 1$ vector as shown in Equation 2.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 2]}$$

And, $\hat{S}$ may be represented as Equation 3 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 3]}$$

Let us consider a case of configuring $N_T$ transmitted signals which are actually transmitted, by applying a weight matrix W to a transmission power adjusted information vector $\hat{S}$. In this case, the weight matrix plays a role in properly distributing each transmitted information to each antenna according to a transmission channel status and the like. The transmitted signals may be represented by $N_T \times 1$ vector as shown in Equation 4. In Equation 4, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 4]}$$

If there are $N_R$ receiving antennas, received signals may be represented by $N_R \times 1$ vector as shown in Equation 5.

$$y = [y_1, y_2, \ldots, y_{N_R}]^T \quad \text{[Equation 5]}$$

When channels are modeled in a multiple antenna communication system, they may be distinguished according to indexes of transmitting and receiving antennas. The channel from a $j^{th}$ transmitting antenna and an $i^{th}$ receiving antenna may be represented as $h_{ij}$. It is to be noted herein that the index of the receiving antenna precedes that of the transmitting antenna in $h_{ij}$.

Channels from $N_T$ transmitting antennas to the $i^{th}$ receiving antenna may be represented as $h_i$, all channels from the $N_T$ transmitting antennas to the $N_R$ receiving antennas may be expressed by Equation 6.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{22} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 6]}$$

Actual channels experience the above channel matrix H and then are added with Additive White Gaussian Noise (AWGN). The AWGN added to the $N_R$ receiving antennas may be expressed as $N_R \times 1$ vector, and received signals are expressed by Equation 7.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 7]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Figure 2:
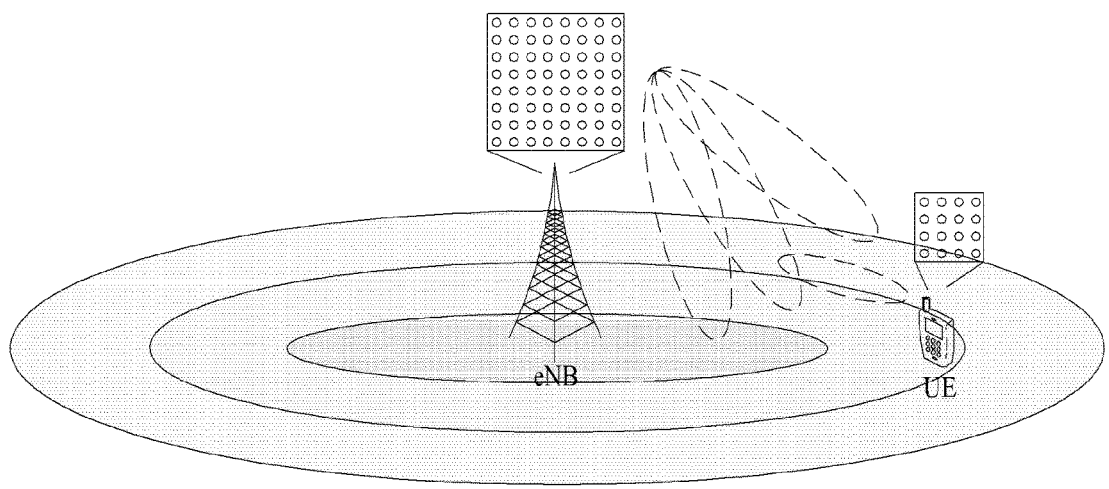
FIG. 2 is a diagram of a massive MIMO environment.

FIG. 2 illustrates a massive MIMO environment. FIG. 2 diagrammatizes a system in which a base station or user equipment has a plurality of transmitting/receiving antennas capable of an active antenna system based 3D beamforming.

Referring to FIG. 2, if a 3D (3-dimensional) beam pattern is utilized in a transmitting antenna aspect, it is able to perform a quasi-static or dynamic beamforming in a vertical direction of a beam as well as in a horizontal direction of the beam. And, it is also able to consider application such as a sector forming in a vertical direction or the like. Moreover, in a receiving antenna aspect, when a receiving beam is formed using massive receiving antennas, it is able to expect a signal power increasing effect in accordance with an antenna array gain. Hence, in case of uplink, a base station can receive a signal transmitted from a user equipment through a plurality of of antennas. In doing so, it is advantageous in that the user equipment can set its transmission power to a very low power in consideration of a gain of the massive receiving antennas in order to reduce interference influence.

Distributed Antenna System

Figure 3:
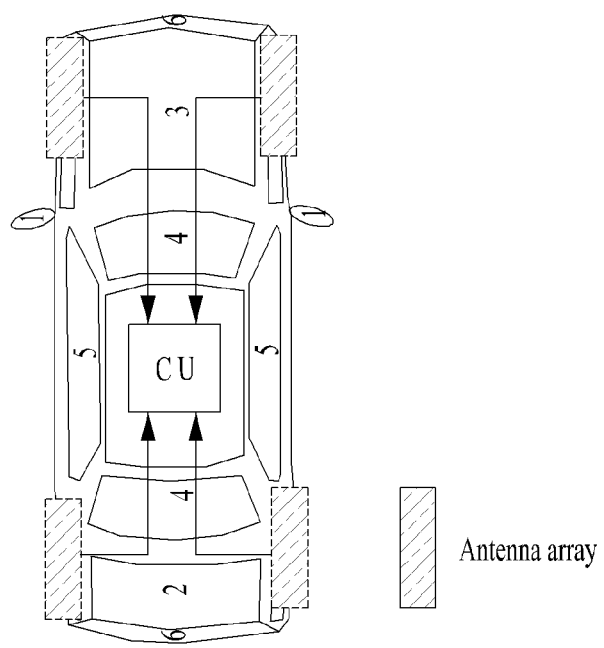
FIG. 3 is a diagram illustrating a distributed antenna system that may be considered in the present invention.

FIG. 3 is a diagram illustrating a distributed antenna system that may be considered in the present invention.

Referring to FIG. 3, antennas that have various shapes and radiation patterns according to an installment position may be distributed at a plurality of portions of a vehicle and a central unit (CU) for integrally controlling transmission and receiving signals through a distributed antenna unit (DU) may be installed. Through a configuration illustrated in FIG. 3, reception diversity gain may be maximized via use of an antenna array, and wireless access between a base station and a vehicle reception end may be prevented from being disconnected through cooperative reception between antennas with different radiation patterns in a high speed movement situation in which a communication environment is abruptly changed.

Figure 4:
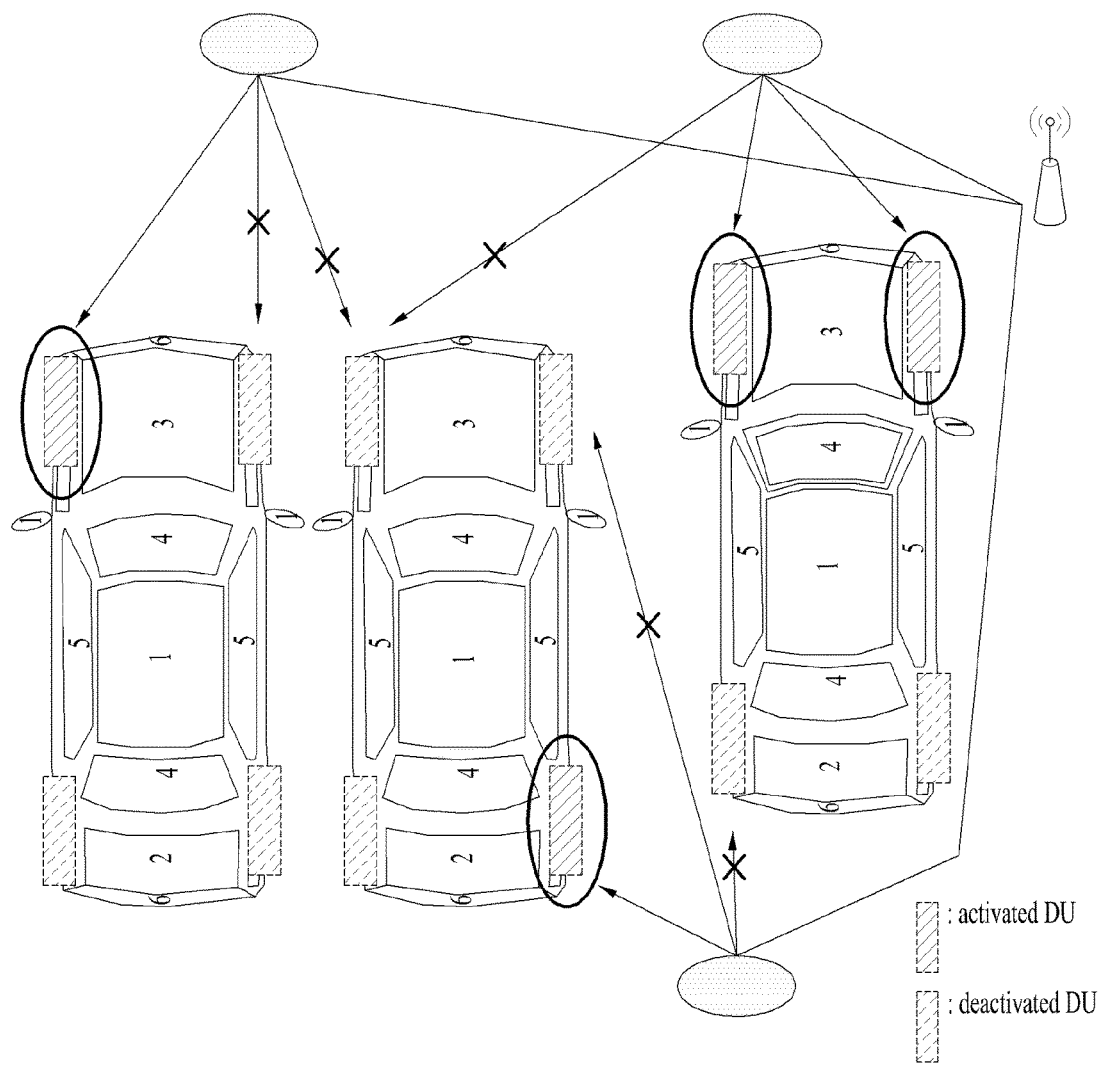
FIG. 4 is a diagram illustrating an example in which a distributed antenna unit is selected in a multi-vehicle situation.

FIG. 4 is a diagram illustrating an example in which a distributed antenna unit is selected in a multi-vehicle situation.

When vehicles are close to each other in a limited area, it is difficult to separate and distinguish beams for users (e.g., vehicles) and distributed antenna arrays thereof due to an issue of beam sharpness in a vehicular distributed antenna array. For example, distributed antenna arrays positioned at very adjacent distances receive signals passing through similar channel environments, and thus the possibility that a plurality of DUs receive the same beam or are blocked by obstacles or cannot receive any beam is very high. Accordingly, in this case, as illustrated in FIG. 2, when a method for selectively activating/deactivating a DU of each vehicle is applied and each vehicle receives beams passing through as much as possible independent paths that experience different clusters from a beam that can be received by an adjacent vehicle through an activated DU of the corresponding vehicle, it may be more advantageous in terms of performance than in the case in which all DUs arranged in each vehicle are activated and used.

Channel State Information (CSI) Measurement and Report

In order to generate a beam appropriate for reception, a transmitting end needs to recognize information about a channel and to accurately measure the appropriate beam and a gain obtained by using the beam based on the recognized channel information. The channel information may be measured by transmitting a separate pilot to the transmitting end by a receiving end, but in the case of a current mobile communication system, the receiving end may measure a channel and then provide the measured information to the transmitting end in the form of CSI. When MIMO is implemented, a channel may be defined by combining sub channels generated between a plurality of transmission and reception antennas, and as the number of antennas used to implement the MIMO increases, a more complex structure may be obtained. According to a method for measuring and reporting channel information, the method may be divided into 1) an implicit CSI reporting method and 2) an explicit CSI reporting method.

The implicit CSI reporting method may be a method for interpreting measured channel information instead of information about a channel measured by a receiving end and selectively reporting only information that is materially required to generate a beam at a transmitting end. Compared with the explicit CSI reporting method, the implicit CSI reporting method is advantageous in that signaling overhead consumed to report CSI is small, and thus the implicit CSI reporting method has been used in a current mobile communication system. For example, the implicit CSI feedback information may include the following information.

When the implicit CSI feedback information has a limited number of precoder candidates, precoder index feedback (e.g., precoding matrix index, and PMI)

Channel Quality Information (CQI)

Rank Information (RI)

The explicit CSI reporting method may be a method for transmitting information that is as much as possible approximate information to a measurement value without interpreting a channel measured by the receiving end. Various methods for reducing signaling overhead used for CSI report via quantization or singular value decomposition (SVD) calculation of a MIMO channel expressed in the form of a matrix may be used. For example, the explicit CSI feedback information may have the following information.

Channel coefficient quantization & quantization index feedback

MIMO matrix or vector quantization & quantization index feedback

Channel covariance matrix feedback

Transmission of Eigen vector of Eigen matrix feedback or Channel matrix and/or Eigen value CSI in LTE System In most cellular systems including a LTE system, a UE may receive a pilot signal or reference signal for channel estimation from a base station, calculate channel state information (CSI), and report the CSI to the base station. The base station may transmit a data signal based on CSI information that is fed back from the UE. The CSI information that is fed back by the UE in the LTE system may include channel quality information (CQI), precoding matrix index (PMI), and rank indicator (RI).

CQI feedback may include radio channel quality information that is provided to a base station for the purpose of providing a guide about a modulation and coding scheme that is applied when the base station transmits data (e.g., link adaptation). When link quality between a base station and a UE is high, the UE may feedback a high CQI value and the base station may apply a relatively high modulation order and a low channel coding rate and transmit data. When link quality between the base station and the UE is low, the UE may feedback a low CQI value and the base station may apply a relatively low modulation order and a high channel coding rate and transmit data.

The PMI feedback may include preferred precoding matrix information that is provided to a base station for the purpose of providing a guide about a MIMO precoding scheme that is applied when the base station is installed with multiple antennas. The UE may estimate a downlink MIMO channel between the base station and the UE from a pilot signal and recommend MIMO precoding to be used by the base station through PMI feedback. An LTE system considers linear MIMO precoding that can be expressed in the form of a matrix for PMI configuration. The base station and the UE may share a codebook configured with a plurality of precoding matrices and each MIMO precoding matrix in the codebook may have a unique index. Accordingly, the UE may feedback an index corresponding to a MIMO precoding matrix that is most preferred in the codebook as PMI so as to minimize the amount of feedback information of the UE.

The RI feedback may include information about the number of preferred transmission layers that are provided to the base station for the purpose of providing a guide about the number of transmission layers preferred by the UE when the base station and the UE are installed with multiple antennas so as to perform multi-layer transmission through spatial multiplexing. The RI has a very close relationship with the PMI. This is because the base station can know precoding to be applied to each layer according to the number of transmission layers. With regard to a PMI/RI feedback configuration, a PMI codebook may be configured based on transmission of a single layer and then PMI may be defined and fed back for each layer, but this method is disadvantageous in that the amount of PMI/RI feedback information is largely increased according to increase in number of transmission layers. Accordingly, a PMI codebook according to the number of transmission layers may be defined in an LTE system. That is, N Nt×R matrices (R is the number of layers, Nt is the number of transmission antenna ports, and N is the size of a codebook) may be defined in a codebook for R layer transmission. Accordingly, the size of the PMI codebook may be defined irrespective of the number of transmission layers in the LTE system. Since PMI/RI is defined according to this structure, the transmission layer number R corresponds to a rank number of the precoding matrix (Nt×R matrix), and thus the transmission layer number R may be referred to as a rank indicator RI.

The CSI information may be obtained from an entire system frequency domain or obtained from a partial frequency domain. In particular, it may be useful to obtain and feedback CSI information about a partial frequency domain (e.g., subband) preferred by each UE in a system using orthogonal frequency division multiple access (OFDMA) technology.

The PMI/RI described in the specification is not limited to indicating an index value of a precoding matrix represented by a Nt×R matrix such as PMI/RI in the LTE system and a rank value of a precoding matrix. The PMI described in the specification may refer to preferred MIMO precoder information among MIMO precoders applicable in a transmission end, and the form of the precoder may not be limited to only a linear precoder that can be represented by a matrix such as in the LTE system. In addition, the RI described in the specification may include any feedback information that refers to a preferred transmission layer number in a broader meaning than in the LTE system.

The PMI information described in the specification is not configured by only one index. In the LTE-A system, a final PMI is divided into W1 as long term and/or wideband (WB) PMI and W2 as short term and/or sub-band (SB) PMI such that PMI with a dual structure is used. For example, the final PMI W may be defined as W=W1*W2 or W=W2*W1. For example, when the number of transmission antenna ports in the LTE-A is 8 or alternativeCodeBookEnabledFor4TX-r12=TRUE is configured via RRC signaling while the number of transmission antenna ports is 4, a final MIMO precoding matrix may be derived by only combining two indexes (WB PMI(W1) and SB PMI(W2)).

CSI Feedback Using Uplink Channel

In the LTE system, CSI feedback may be performed through an uplink channel. Periodic CSI feedback may be performed through a physical uplink control channel (PUCCH) and aperiodic CSI feedback may be performed through a physical uplink shared channel (PUSCH) as an uplink data channel. However, an information payload size in a reporting type may be defined according to a reporting mode and a mode state in CSI feedback through PUCCH, and a payload size of PUCCH format 2/2a/2b (PUCCH format 3 that can be used to apply carrier aggregation is excluded) that is defined in the LTE system may be very restrictive.

Figure 5:
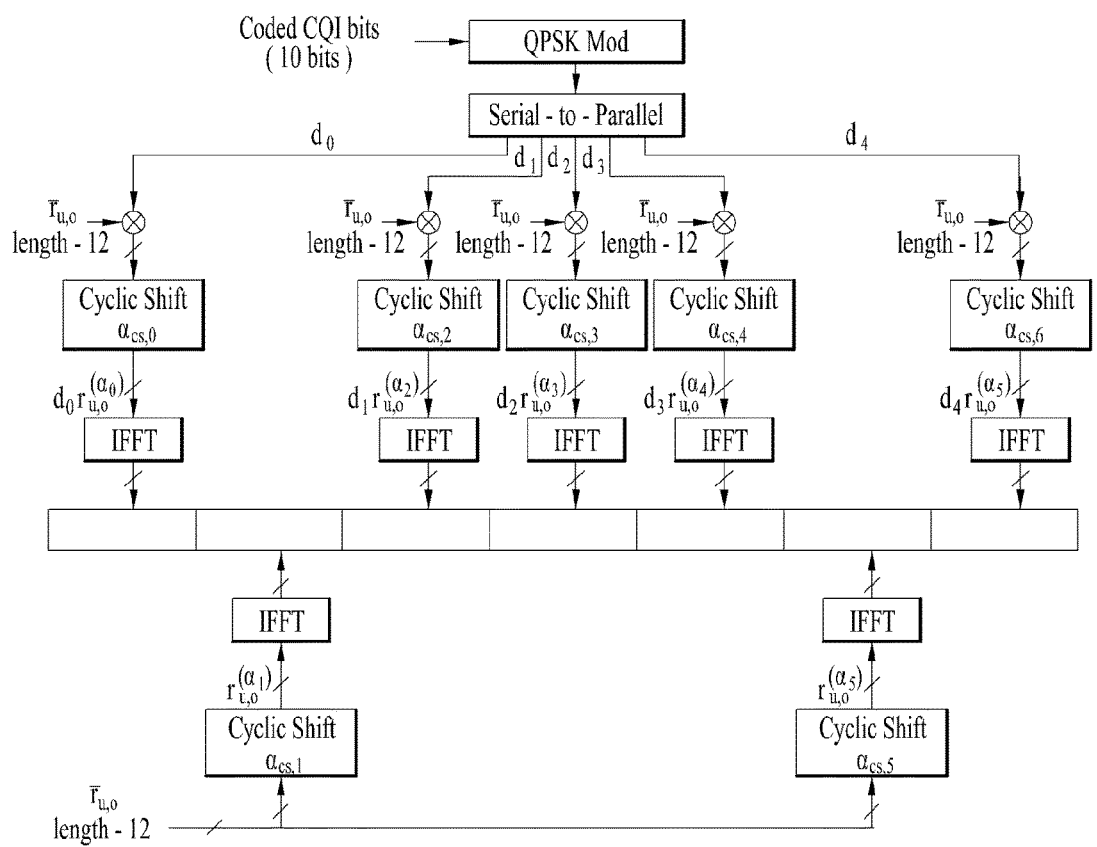
FIG. 5 is a diagram illustrating a structure of PUCCH format 2/2a/2b in an LTE system.

FIG. 5 is a diagram illustrating a structure of PUCCH format 2/2a/2b in an LTE system.

Cyclic shift (CS) of a sequence in each OFDM symbol may be used as PUCCH format. The cyclic shifted sequence may be generated by cyclic shifting a base sequence by as much as a specific CS amount.

FIG. 5 illustrates a channel structure of PUCCH format 2/2a/2b of one slot in a normal CP. PUCCH format 2/2a/2b may be generated through the following steps.

Step 1. 10 CQI information bits may be channel-coded at a ratio of 1/2 to obtain 20 coded bits. For example, a Reed-Muller (RM) code may be used in channel coding.

Step 2. A QPSK modulation symbol may be generated via scrambling and then QPSK constellation mapping (d0 to d4 in slot 0).

Step 3. Each QPSK modulation symbol may be modulated via cyclic shift of a base reference signal (RS) sequence with a length of 12 and then transmitted in each of 10 single carrier frequency division multiple access (SC-FDMAs) symbols in a subframe.

Step 4. 12 cyclic shifts that are uniformly spaced may be configured in such a way that 12 different UEs are orthogonally multiplexed in the same PUCCH resource block. A base RS sequence with a length of 12 may be used for a demodulation reference signal (DM RS) sequence applied to SC-FDMA symbols 1 and 5.

The 20 coded bits in Step 2 may be scrambled by a UE-specific scrambling sequence and may be represented according to Equation 8 below.

$$\tilde{b}(i)=(b(i)+c(i))\bmod 2 \qquad \text{[Equation 8]}$$

In Equation 8, b(i) denotes a control information (or CQI information) bit sequence, c(i) denotes a scrambling sequence, $\tilde{b}(i)$ is a scrambled control information (or CQI information) bit sequence, and mod refers to modulo calculation. The scrambling sequence c(i) may be generated according to Equation 9 and initialized according to Equation 10 at every start of a subframe. In Equation 9, Nc may be 1600, $x_1(0)=1$, and $x_1(n)=0$, $n=1, \ldots, 30$.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \qquad \text{[Equation 9]}$$

$$c_{init}=(\lfloor n_s/2 \rfloor+1)\cdot(2N_{ID}^{cell}+1)\cdot 2^{16}+n_{RNTI} \qquad \text{[Equation 10]}$$

In Equation 10, $n_{RNTI}$ may refer to identification information of a corresponding UE and may be a cell-radio network temporary identifier (C-RNTI). Accordingly, when control information (or CQI information) is transmitted through a PUCCH, the control information may be scrambled based on the identification information of the corresponding UE, and another UE cannot recognize the identification information of the corresponding UE, and thus the another UE cannot acquire control information transmitted from the corresponding UE.

Multiuser MIMO with Densely-Distributed Users

In general, in single user-MIMO (SU-MIMO), only data of a single user may be scheduled in the same time/frequency domain. On the other hand, in the case of multiuser-MIMO (MU-MIMO) in which a single eNB intends to communicates with a plurality of UEs, data of a plurality of users may be scheduled together in the same time/frequency domain. A current communication system is operated in such a way that, even if a plurality of users are present in a cell, users are selectively scheduled to prevent performance from being degraded due to influence of an interference signal between users and, thus, as many interference signals as possible between users may be avoided to enhance QoS of a served user.

However, channel information of a user needs to be pre-known for user scheduling and, when numerous UEs are densely distributed in a narrow area, the number of resources occupied by a UL reference signal therefore needs to be remarkably increased and, thus, resources to be used in data transmission may be insufficient. In addition, it is known that user scheduling is efficient when more users present in a cell are present than the number of antennas of an eNB and, thus, an effect of enhancing system transmission efficiency of a scheduling-based MU-MIMO transmission scheme may be insignificant in a situation in which a massive MIMO system is considered.

A time division multiple access (TDMA)/frequency division multiple access (FDMA) method for scheduling data of a plurality of users together has a limit in enhancing transmission efficiency because only a single UE uses the same resource. Accordingly, a multiuser method in which a multiuser shares the same time/frequency resource and performs communication may be considered. For example, a multiuser-MIMO (MU-MIMO) method in which different UEs use as spatially separated beams as possible and perform communication in the same time/frequency resource may be considered. This method may include a method of dividing a spatial resource via multiple beamforming and performing multiple access and the method of dividing a spatial resource and performing multiple access may also be referred to as space division multiple access (SDMA).

An MU-MIMO technology such as SDMA may be performed via an independent channel as possible so as to space a beam apart from a multiuser (or device). When the multiuser has similar radio channel characteristics (e.g., when a correlation is high), MU-MIMO performance may be reduced and it may be difficult to apply the MU-MIMO technology. An environment in which the multiuser has similar radio channel characteristics may be generated when a plurality of UEs are adjacently present to each other and, for example, a problem may arise, in particular, when numerous UEs are densely distributed in a narrow area, such as a stadium environment or an environment of densely distributed vehicles.

Accordingly, a multiuser/multiple stream transmission scheme via sharing a beam between users may be considered as an example of resolution and, in more detail, a multiuser/multiple stream transmission scheme via sharing a beam between users based on cooperation between UEs may be considered. When the multiuser/multiple stream transmission scheme via sharing a beam between users is used, even if a plurality of UEs are densely distributed to have similar radio channel characteristics, system transmission efficiency may be enhanced.

As a scheme for enhancing transmission efficiency via sharing a beam between users transmission efficiency, a NOMA scheme and a broadcast/multicast scheme via a shared beam may be considered. The shared beam may refer to a beam that is commonly formed for a plurality of users to simultaneously transmit/receive to a plurality of users and may refer to a UE-common beam. A signal for a plurality of users may be simultaneously transmitted/received via a shared beam. A UE-dedicated beam may refer to a beam formed to transmit/receive a signal to a specific user and a signal for the specific user may be transmitted/received through the UE-dedicated beam.

Non-Orthogonal Multiple Access (NOMA)

When a plurality of UEs are densely distributed to have similar radio channel characteristics, UE-dedicated symbols of different users may be transmitted to one beam to be supposed on each other, thereby enhancing transmission efficiency. In detail, when it is difficult to apply a general SDMA technology like in a situation in which a densely distributed multiuser needs to be simultaneously supported, non-orthogonal multiple access (NOMA) schemes such as hierarchical modulation and superposition coding may be considered.

In an NOMA-based system, an eNB may transmit corresponding data symbols to be superposed on each other with respect to a plurality of UEs (e.g., a UE positioned in a cell-centered region and a UE of a cell boundary) with a high difference between channel qualities. In this case, for example, low power may be allocated to a UE of a cell-centered region and high power may be allocated to a UE of a cell boundary region. A cell-centered UE may decode and cancel an interference signal of a cell boundary UE with high signal intensity to successfully decode a signal thereof using a successive interference cancellation (SIC) method and, an interference signal of a cell-centered UE is weakly reached and, thus, a cell boundary UE may decode a signal thereof while considering the interference signal of the cell-centered UE as interference.

Broadcast/Multicast by Shared Beam

When a plurality of UEs are densely distributed to have similar radio channel characteristics, a common data symbol to a plurality of users may be broadcast or multicast to a shared beam between users to enhance transmission efficiency. A plurality of users that share a beam may be UEs grouped as one UE group or adjacent UEs.

In a current LTE/LTE-A system, an eNB may transmit data in all directions without selection of a user preferred beam in a broadcast transmission mode. On the other hand, according to a broadcast/multicast scheme according to the present invention, the eNB may transmit a UE-specific data symbol to a multiuser and, simultaneously, may broadcast/multicast a UE-common data symbol to a beam (or a shared beam) shared by a densely distributed multiuser. Each user may receive a data symbol thereof from a UE-dedicated beam and, simultaneously, may additionally receive a UE-common data symbol from a shared beam, thereby enhancing data transmission efficiency for each user.

Figure 6:
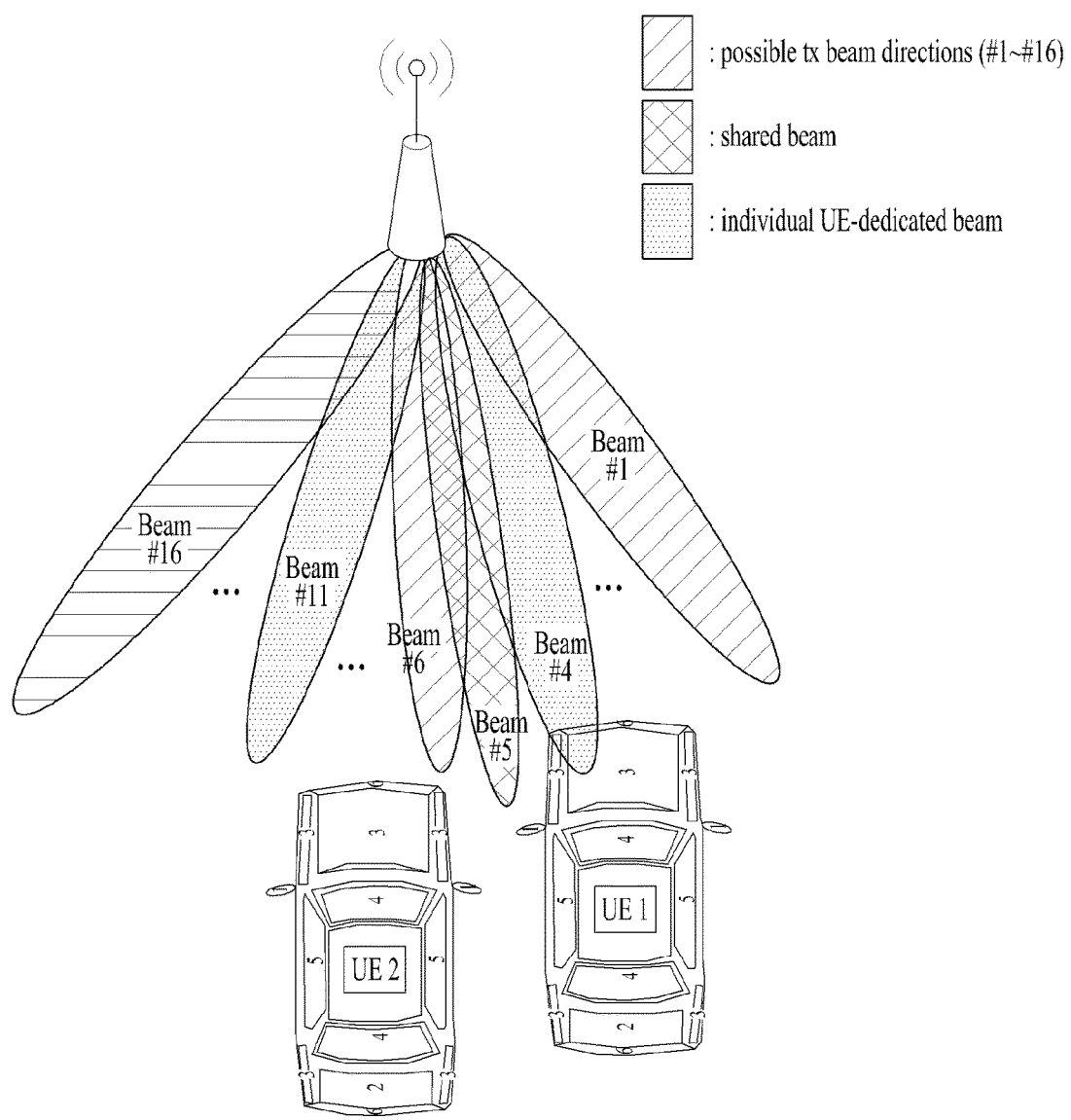
FIG. 6 is a diagram showing a data transmission method according to the present invention.

FIG. 6 is a diagram showing a data transmission method according to the present invention. In an example of FIG. 6, it may be assumed that an eNB performs beamforming in 16 beam directions to form at least one beam and transmits a signal (e.g., a data signal or a symbol) through the formed beam. Accordingly, in the example of FIG. 6, the eNB may simultaneously transmit a signal to at least one beam direction among the 16 beam directions. The number of the beam directions shown in FIG. 6 is merely an example and, even if there are greater or fewer beam directions, the present invention may be applied in the same/similar way. In the example of FIG. 6, it may be assumed that a first UE (UE1) and a second UE (UE2) each include multiple reception antennas.

Referring to FIG. 6, beam #5 may be commonly used to transmit and receive a signal for the first UE (UE1) and the second UE (UE2) and, thus, may correspond to a shared beam. On the other hand, beam #4 may be used to transmit and receive a signal of the first UE (UE1) but may not be used to transmit a signal for the second UE (UE2) and, thus, may correspond to a UE-dedicated beam for the first UE (UE1). Similarly, beam #11 may be used to transmit and receive a signal for the second UE (UE2) but may not be used to transmit and receive a signal for the first UE (UE1) and, thus, may correspond to a UE-dedicated beam for the second UE (UE2).

The first UE (UE1) may have a multiple antenna, may receive beam #5 (or a signal transmitted therethrough) through a first antenna, and may receive beam #4 (or a signal transmitted therethrough) through a second antenna. Similarly, the second UE (UE2) may have a multiple antenna, may receive beam #5 (or a signal transmitted therethrough) through a first antenna, and may receive beam #11 (or a signal transmitted therethrough) through a second antenna.

When an eNB simultaneously forms three beams (e.g., beam #4, #5, and #11) through an antenna array, the eNB may broadcast common data to the first UE and the second UE through a shared beam (e.g., beam #5), may transmit UE-specific data to the first UE through a UE-dedicated beam (e.g., beam #4), and may transmit UE-specific data to the second UE through a UE-specific beam (e.g., beam #11). Accordingly, the eNB may transmit UE-common data to the first UE (UE1) through a shared beam (e.g., beam #5) and, simultaneously, may transmit UE-specific data through a UE-dedicated beam (e.g., beam #4), thereby enhancing data transmission efficiency. Similarly, an UE may transmit UE-common data to the second UE (UE2) through a shared beam (e.g., beam #5) and, simultaneously, may transmit UE-specific data through a UE-dedicated beam (e.g., beam #11), thereby enhancing data transmission efficiency.

Hereinafter, the present invention proposes a scheme of selecting a direction of a shared beam between users in a group (or adjacent users) or selecting a direction of a UE-dedicated beam when data is (additionally) transmitted using a shared beam between users in a group (or adjacent users). The beam direction may be determined by a precoder and, thus, a beam (or a beam direction) may have equivalent meaning as the precoder. Alternatively, a precoder may apply a precoding matrix to form a beam and, thus, a beam (or a beam direction) may have equivalent meaning to a precoding matrix index. Alternatively, a specific beam may be formed/transmitted through a specific antenna port and, thus, a beam (or a beam direction) may have equivalent meaning to a specific antenna port. For example, determination of a beam (or a beam direction) may have equivalent meaning to determination of a precoder for a corresponding beam and/or determination of a precoding matrix index for a corresponding beam, and transmission/reception of a signal through a beam (or a beam direction) may have equivalent meaning to transmission/reception of a signal through a specific antenna port to a corresponding beam.

A method of designing a precoder based on cooperation between users for multiuser/multiple stream downlink transmission via sharing of a beam between UEs according to the present invention may be performed via the following procedures.

Operation 1: Determine Shared Beam

UEs in a group or adjacent UEs may share preferred beam information thereof, may determine a preferred shared beam via cooperation between UEs and, then, may feedback the preferred shared beam to an eNB. A UE group or adjacent UEs may be determined by the eNB based on a beam direction and, then, the eNB may transmit/share information about the UE group or adjacent UEs to corresponding UEs. For example, the information about the UE group or adjacent UEs may include information indicating a representative UE or a header UE and/or information indicating a member UE. As another example, the information about the UE group transmitted/shared by the eNB may indicate a representative UE (or a header UE) and/or a member UE through one piece of information.

To share preferred beam information by UEs in a group or adjacent UEs, each user may broadcast/multicast information about preferred beam thereof (e.g., a preferred shared beam). Alternatively, each UE may transmit information about preferred beam thereof to a UE (e.g., a representative UE or a header UE) determined by an eNB in a group or a specific type of UE (e.g., a UE according to existing LTE/LTE-A standard).

Each user may share a plurality of preferred beam information items thereof with an adjacent user and, when users share a plurality of preferred beam directions, it may be possible to share a preferred beam direction and priority thereof. In this case, the information about the preferred beam that is transmitted/broadcast/multicast by each user may include at least one of information about the number of preferred beams, information indicating a preferred beam direction, or information about priority when there is a plurality of preferred beams.

The shared beam direction may be determined and/or fed back by a specific UE among a UE group or adjacent UEs. For example, a UE that determines and feeds back a shared beam direction may be autonomously determined via cooperation between UEs, a UE (e.g., a representative UE or a header UE) determined by an eNB, or a specific type of UE (e.g., a UE according to existing LTE/LTE-A standard).

The shared beam direction may be determined by a beam direction selected by most UEs from shared preferred beam direction information of each user.

Feedback of determined shared beam information may be set to perform corresponding feedback by only some UEs (e.g., a representative UE or a header UE) in a group, thereby reducing overhead in terms of a system.

The determined shared beam information may be transmitted to the eNB through a PUCCH signal (e.g., refer to FIG. 5). In this case, UEs that do not feedback the determined shared beam information may overhear a PUCCH signal between the eNB and a representative UE or a header UE using lastly determined shared beam information or the representative UE or the header UE may broadcast/multicast the determined shared beam information to other UEs to acquire the determined shared beam information.

In the present specification, overhearing may refer to reception and/or acquisition of UE-specific information (e.g., uplink control information (UCI)) of another UE by a specific UE. In more detail, overhearing may include acquiring scrambling information for control information of another UE by a specific UE and decoding and/or acquiring the control information of the other UE using the acquired scrambling information. For example, a specific UE may acquire identification information (e.g., C-RNTI) of another UE via overhearing and, then, may decode and/or acquire the control information (e.g., preferred beam information) of the other UE using the acquired identification information (e.g., C-RNTI). In the present specification, scrambling information may not be limited only to C-RNTI information and other information may be used.

A plurality of candidate beam directions as a shared beam direction may be inducted via cooperation between UEs and a lastly shared beam direction may be determined by an eNB. In this case, the eNB may or may not notify UEs in a group about information about the determined shared beam thereof.

Referring back to FIG. 6, as an example of shared beam determination and a feedback procedure in operation 1 according to the present invention, the first UE (UE1) and the second UE (UE2) may be determined as a UE group or adjacent UEs. In the example of FIG. 6, the first UE (UE1) may select beam #1 to beam #5 as a preferred beam (direction) and the second UE (UE2) may select beam #5 to beam #16 as a preferred beam (direction). Each UE (UE1 and UE2) may broadcast/multicast preferred beam information thereof or transmit the preferred beam information thereof to a representative UE. In this case, preferred beam information of a first UE may include at least one of information about the number (e.g., 5) of preferred beams, information indicating a preferred beam (e.g., beam #1 to beam #5), or information indicating priority between preferred beams and preferred beam information of a second UE may include at least one of information about the number (e.g., 12) of preferred beams, information indicating a preferred beam (e.g., beam #5 to beam #16), or information indicating priority between preferred beams.

In an example of FIG. 6, when the first UE (UE1) is determined as a representative UE or a header UE, the first UE (UE1) may broadcast/multicast preferred beam information thereof or may not transmit the preferred beam information to the second UE (UE2). The first UE (UE1) may receive preferred beam information from the second UE (UE2), may recognize that the second UE (UE2) prefers beam #5 to beam #16, may check whether the preferred beam direction thereof overlaps the preferred beam information of the second UE (UE2), and may lastly determine a shared beam direction between two UEs as beam #5. This is merely an example of beam direction selection and is not limited to a share beam selection scheme.

In the example of FIG. 6, the first UE (UE1) may transmit information about the determined beam (e.g., beam #5) to the eNB through a PUCCH signal. In addition, the first UE (UE1) may transmit information about the determined shared beam (e.g., beam #5) to the second UE (UE2) that is not a representative UE or a header UE to share information about the determined shared beam (e.g., beam #5) or the second UE (UE2) may overhear a PUCCH signal transmitted by the first UE to acquire information about the determined shared beam (e.g., beam #5).

Although FIG. 6 illustrates that one beam (e.g., beam #5) is a preferred beam common between the first UE (UE1) and the second UE (UE2), a plurality of beams may be common. In this case, a representative UE or a header UE (e.g., a first UE or UE1) may transmit information about a plurality of candidate beams corresponding to a plurality of common beams to an eNB. In this case, a shared beam may be determined by the eNB among a plurality of candidate beams or the determined shared beam may or may not be shared by the first UE (UE1) and the second UE (UE2). An operation when the determined shared beam is or is not shared by the first UE (UE1) and the second UE (UE2) will be described below in detail. A plurality of candidate beam information items may be induced by a first UE (or a representative UE or a header) based on preferred beam information received from a second UE or may be induced via cooperation between the first UE and the second UE.

Alternatively, differently from the aforementioned case, the first UE (UE1) and the second UE (UE2) may not share preferred beam information and may transmit preferred beam information to the eNB and, then, the eNB may determine a shared beam.

Operation 2: Determine UE-Dedicated Beam

Each UE may select a UE-dedicated beam direction preferred thereby among remaining beam directions except for a shared beam direction based on the shared beam information acquired in operation 1 according to the present invention and may feedback information about the UE-dedicated beam to the eNB. The information about the UE-dedicated beam may be transmitted to the eNB through a PUCCH signal (e.g., refer to FIG. 5) and may include precoder information, precoding matrix index information, or the like corresponding to the UE-dedicated beam.

A plurality of candidate beam directions as a shared beam direction may be induced via cooperation between UEs and, when a lastly shared beam direction is determined by the eNB, each UE may determine a UE-dedicated beam direction using the following two methods.

When an eNB notifies UEs in a group about lastly determined shared beam information by transmitting the information: a UE may determine a UE-dedicated beam direction among all remaining beam directions except for a lastly determined shared beam direction.

When an eNB does not notify UEs in a group or adjacent UEs about lastly shared beam information: UEs knows only a candidate set of a plurality of shared beams induced via cooperation between the UEs and, thus, each UE may select a UE-dedicated beam direction among remaining beam directions except for all beam directions corresponding to a shared beam candidate set from all beam directions.

The eNB may receive UE-dedicated beam information from each UE and, then, may transmit UE-common data through a shared beam and, simultaneously, may transmit UE-specific data through a UE-dedicated beam. In the present specification, UE-common data transmitted/received through a shared beam may refer to a signal transmitted/received through a broadcast/multicast channel and, for example, may be one of a physical broadcast channel (PBCH) and a physical multicast channel (PMCH). The UE-specific data may refer to a signal transmitted/received through a channel allocated for a specific UE and, for example, a channel allocated for a specific UE may be a physical downlink shared channel (PDSCH).

Referring back to FIG. 6, an example of UE-dedicated beam determination and a feedback procedure in operation 2 according to the present invention, the first UE (UE1) and the second UE (UE2) may determine a UE-dedicated beam direction among preferred beam directions thereof. Assuming that beam #5 is determined as a shared beam in the above case, the first UE (UE1) may determine a preferred UE-dedicated beam direction among remaining beam directions (e.g., beam #1 to beam #4) except for a shared beam (e.g., beam #5) from preferred beam directions thereof (e.g., beam #1 to beam #5) and the second UE (UE2) may determine a preferred UE-dedicated beam direction among remaining beam directions (e.g., beam #6 to beam #16) except for a shared beam (e.g., beam #5) from preferred beam directions thereof (e.g., beam #5 to beam #16).

Referring back to FIG. 6, in operation 2, the first UE (UE1) may determine beam #4 that is not a shared beam (e.g., beam #5) as a preferred UE-dedicated beam thereof and may transmit information indicating beam #4 to the eNB. The second UE (UE2) may determine beam #11 that is not a shared beam (e.g., beam #5) as a preferred UE-dedicated beam thereof and may transmit information indicating beam #11 to the eNB. The eNB may unicast/broadcast/multicast common data to the first UE (UE1) and the second UE (UE2) through the shared beam received or determined in operation 1 and, simultaneously, may unicast specific data to the first UE (UE1) or the second UE (UE2) through the dedicated beam received in operation 2.

According to the present invention, when a method of designing a precoder based on cooperation between users for multiuser/multiple stream downlink transmission via sharing of a beam between users is applied, there is a difference from a conventional method.

An eNB may receive a plurality of preferred beam information items with respect to respective separate UEs. Accordingly, a preferred shared beam (transmission of common information to UEs in a group) and preferred UE-dedicated beam (transmission of UE-specific information) may be set for each UE. In a conventional method, an eNB may receive one preferred beam information item from each UE and may set one beam for a corresponding UE based on the information. On the other hand, according to the present invention, different types of information items are capable of being simultaneously transmitted through a plurality of UEs set for respective UEs and, accordingly, transmission efficiency may be advantageously enhanced.

When each UE selects a preferred beam to transmit a data stream thereof, a preferred beam direction thereof may be determined among remaining beam directions except for the above shared beam determined via cooperation between UEs. Accordingly, a UE-dedicated beam and a shared beam for a corresponding UE may be prevented from being set to be superposed and setting of different beams may be ensured. When the shared beam and the UE-dedicated beam are set to be superposed, interference may occur and data transmission efficiency may also be lowered.

Figure 7:
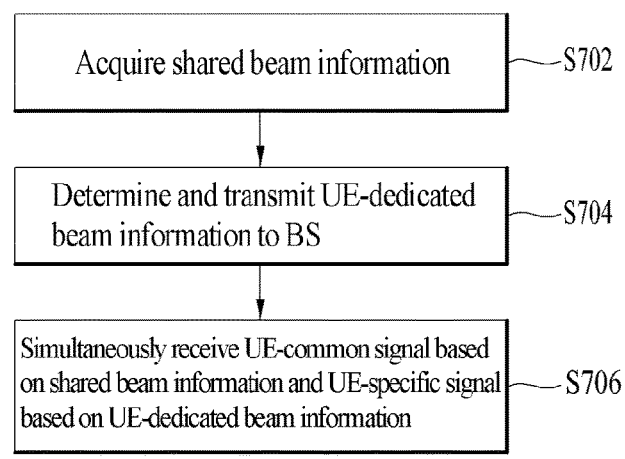
FIG. 7 is a flowchart according to the present invention.

FIG. 7 is a flowchart according to the present invention. The flowchart of FIG. 7 is a non-limited example, some operations may be omitted, and other operations that are not shown in FIG. 7 may be added.

Referring to FIG. 7, in operation S702, a UE may acquire information about a shared beam to be shared by UEs in a group and adjacent UEs. Operation S702 may be performed by the operations of a UE and/or an eNB described with regard to operation 1 according to the present invention or may include performing the operations of a UE and/or an eNB described with regard to operation 1.

For example, in operation S702, when a UE is a representative UE or a header UE, the UE may receive information about a preferred beam from UEs in a group or adjacent UEs and determine at least one shared beam based on the received information about the preferred beam. The received information about the preferred beam may include at least one of information about the number of preferred beam directions of UEs in a group or adjacent UEs, information about at least one preferred beam of another UE that is not the above UE, or information indicating priority of the at least one preferred beam.

The information about the group to which the UE belongs or the adjacent UEs may be received from the eNB and may include information indicating a representative UE or a header UE among UEs in a group or adjacent UEs and information indicating one or more member UEs. In this case, the information may indicate that the UE is a representative UE or a header UE.

In operation S702, when a UE is a representative UE or a header UE, the UE may transmit information about the at least one determined shared beam to the eNB. The information about the at least one shared beam transmitted to the eNB may include precoding matrix index (PMI) information. As described above, when the UE determines a plurality of shared beams and transmits the determined shared beams to the eNB, the shared beam may be determined by the eNB and may or may not be shared by UEs.

As another example, in operation S702, when a UE is not a representative UE or a header UE (or when the UE is a member UE), the UE may determine at least one preferred beam thereof and unicast or broadcast/multicast information about the determined at least one preferred beam to a representative UE or a header UE. In addition, the UE may overhear information about the determined at least one shared beam by a representative UE or a header UE, receive the information via direct communication (or D2D communication) between UEs from a representative UE or a header UE, or receive or acquire the information from the eNB.

Operations S704 and S706 may be performed by the operations of a UE and/or an eNB described with regard to operation 2 according to the present invention or may include performing the operations of a UE and/or an eNB described with regard to operation 2.

For example, in operation S704, the UE may determine a dedicated beam thereof based on the information about at least one shared beam acquired in operation S702 and transmit the determined information about the dedicated beam to the eNB.

In operation S706, the eNB may transmit (unicast/broadcast/multicast) UE-common data based on the information about the at least one shared beam received in operation S702 and transmit (unicast) specific data to a corresponding UE based on the information about the dedicated beam of a specific UE received in operation S704. In detail, the eNB may transmit UE-common data corresponding to the shared beam information and transmit UE-specific data in a beam direction corresponding dedicated beam information. In this case, the eNB may simultaneously transmit UE-common data and UE-specific data. Simultaneous transmission may refer to transmission in the same time interval (e.g., a subframe in the case of an LTE/LTE-A system). Through a plurality of beamforming operations performed by the eNB, the UE may simultaneously receive UE-common data that is common to UEs in a group or adjacent UEs and UE-specific data thereof.

In operation S706, the UE-common data may be transmitted/received through a physical broadcast channel (PBCH) or a physical multicast channel (PMCH) and the UE-specific data may be transmitted/received through a physical downlink shared channel (PDSCH). For beamforming in a wireless communication system, a plurality of antenna ports (a physical antenna ports or a virtual antenna port) may be determined, a first antenna port may be dedicatedly determined to transmit a shared beam among the plurality of antenna ports, and a second antenna port may be dedicatedly determined to transmit a dedicated beam. In this case, the UE-common data may be transmitted/received to and from the first antenna port specific to a shared beam and the UE-specific data may be transmitted/received to and from the second antenna port specific to a dedicated beam.

In the specification, although the methods according to the present invention have been described in terms of multi-vehicle communication, the present invention is not limited thereto and may be applied in the same way to a general multiuser multi antenna system situation. Thus, the present invention may be applicable to a UE other than a vehicle in the same or similar manner.

Figure 8:
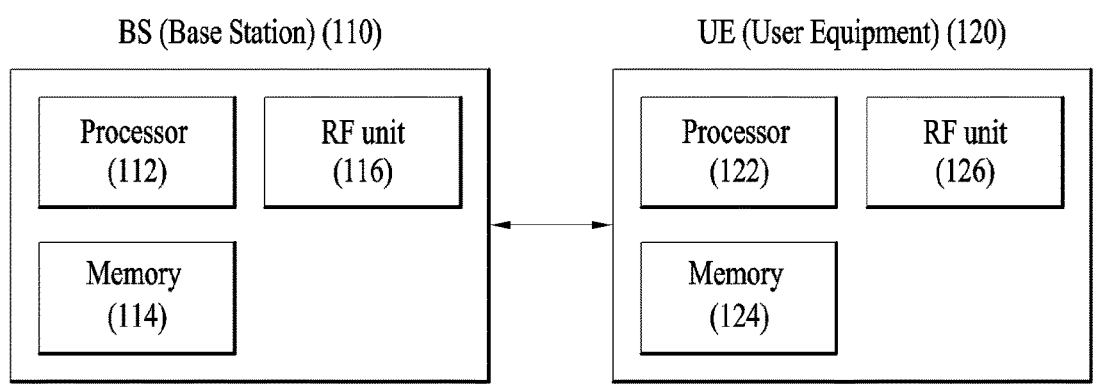
FIG. 8 is a diagram illustrating a BS and a UE to which the present invention is applicable.

FIG. 8 is a diagram illustrating a BS 110 and a UE 120 to which the present invention is applicable.

Referring to FIG. 8, a wireless communication system includes the BS 110 and the UE 120. When the wireless communication system includes a relay, the BS 110 or the UE 120 can be replaced with the relay.

The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits/receives a radio signal. The UE 120 includes a process 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method of receiving a signal by a user equipment (UE) in a wireless communication system, the UE comprising at least one distributed antenna unit (DU), the method comprising:
   receiving information about a preferred beam through the DU from another UE, the information about the preferred beam comprising information indicating at least one preferred beam for the another UE;
   determining at least one shared beam based on the received information about the preferred beam;
   transmitting information about the determined at least one shared beam through the DU to a base station (BS);
   determining a dedicated beam of the UE based on the determined at least one shared beam;
   transmitting information about the determined dedicated beam through the DU to the BS; and
   simultaneously receiving UE-common data based on the information about the at least one shared beam and UE-specific data based on the information about the dedicated beam from the BS.

2. The method according to claim 1, further comprising receiving group information from the BS, wherein the group information comprises information indicating a representative UE in a UE group and information indicating one or more member UEs, and wherein the UE corresponds the representative UE.

3. The method according to claim 1, further comprising determining at least one preferred beam of the UE,
   wherein the at least one shared beam is determined from among beams overlapping between the at least one preferred beam for the UE and the at least one preferred beam for the another UE.

4. The method according to claim 1, further comprising receiving information indicating a specific shared beam from the BS,
   wherein the dedicated beam is determined from among beams other than the specific shared beam.

5. The method according to claim 1, wherein the information regarding the preferred beam further comprises information regarding priority of at least one shared beam candidate.

6. The method according to claim 1, wherein each of the information regarding the shared beam and the information regarding the dedicated beam comprises precoding matrix index information.

7. The method according to claim 1, wherein the UE-common data is received through a physical broadcast channel (PBCH) and the UE-specific data is received through a physical downlink shared channel (PDSCH).

8. The method according to claim 1, wherein the UE-common data is received through a physical multicast channel (PMCH) and the UE-specific data is received through a physical downlink shared channel (PDSCH).

9. The method according to claim 1, wherein the UE-common data and the UE-specific data are received through different antenna ports.

10. A user equipment (UE) for transmitting precoding information in a wireless communication system, the UE comprising:
at least one distributed antenna unit (DU) configured to transmit and receive a radio signal; and
a processor connected to the DU while being operated,
wherein the processor is configured to receive information about a preferred beam from another UE, the information about the preferred beam comprising information indicating at least one preferred beam for the another UE, to determine at least one shared beam based on the received information about the preferred beam, to transmit information about the determined at least one shared beam to a base station (BS), to determine a dedicated beam of the specific UE based on the determined at least one shared beam, to transmit information about the determined dedicated beam to the BS, and to simultaneously receive UE-common data based on the information about the at least one shared beam and UE-specific data based on the information about the dedicated beam, from the BS.

11. The UE according to claim 10, wherein the processor is further configured to receive group information from the BS, and
wherein the group information comprises information indicating a representative UE in a UE group and information indicating one or more member UEs, and
wherein the UE corresponds the representative UE.

12. The UE according to claim 10, wherein the processor is further configured to determine at least one preferred beam of the UE, and
wherein the at least one shared beam is determined from among beams overlapping between at least one preferred beam for the UE and the at least one preferred beam for the another UE.

13. The UE according to claim 10, wherein the processor is further configured to receive information indicating a specific shared beam from the BS, and
wherein the dedicated beam is determined from among beams other than the specific shared beam.

14. The UE according to claim 10, wherein the information about the preferred beam further comprises information about priority of at least one shared beam candidate.

15. The UE according to claim 10, wherein each of the information about the shared beam and the information about the dedicated beam comprises precoding matrix index information.

16. The UE according to claim 10, wherein the UE-common data is received through a physical broadcast channel (PBCH) and the UE-specific data is received through a physical downlink shared channel (PDSCH).

17. The UE according to claim 10, wherein the UE-common data is received through a physical multicast channel (PMCH) and the UE-specific data is received through a physical downlink shared channel (PDSCH).

18. The UE according to claim 10, wherein the UE-common data and the UE-specific data are received through different antenna ports.

19. The UE according to claim 10, wherein the DU is an activated DU.

20. The method according to claim 1, wherein the DU is an activated DU.

* * * * *